US012094487B2

(12) United States Patent
Faundez Hoffmann et al.

(10) Patent No.: US 12,094,487 B2
(45) Date of Patent: Sep. 17, 2024

(54) AUDIO SYSTEM FOR SPATIALIZING VIRTUAL SOUND SOURCES

(71) Applicant: META PLATFORMS TECHNOLOGIES, LLC, Menlo Park, CA (US)

(72) Inventors: Pablo Francisco Faundez Hoffmann, Kenmore, WA (US); Peter Harty Dodds, Seattle, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 300 days.

(21) Appl. No.: 17/480,740

(22) Filed: Sep. 21, 2021

(65) Prior Publication Data

US 2023/0093585 A1 Mar. 23, 2023

(51) Int. Cl.

| | |
|---|---|
| ***G10L 25/78*** | (2013.01) |
| ***G10L 25/18*** | (2013.01) |
| ***H04R 5/027*** | (2006.01) |
| ***H04S 7/00*** | (2006.01) |
| *H04R 5/033* | (2006.01) |

(52) U.S. Cl.

CPC .............. *G10L 25/78* (2013.01); *G10L 25/18* (2013.01); *H04R 5/027* (2013.01); *H04S 7/303* (2013.01); *G10L 2025/783* (2013.01); *H04R 5/033* (2013.01)

(58) Field of Classification Search

CPC ......... G10L 25/78; G10L 25/00; G10L 25/03; G10L 25/18; G10L 25/39; G10L 25/48; G10L 25/72; G10L 25/75; G10L 2025/783; G10L 2021/02165–02168

USPC ........ 704/500, 278, 250, 255, 205, 208, 233

See application file for complete search history.

(56) References Cited

U.S. PATENT DOCUMENTS 10,638,248 B1 * 4/2020 Dodds .............. G10K 11/17873
2015/0346495 A1 * 12/2015 Welch .................. G02B 27/017 345/8
2019/0362564 A1 * 11/2019 Shen ..................... G06T 19/006
2019/0364377 A1 11/2019 Valavanis (Continued)

OTHER PUBLICATIONS

Invitation to Pay Additional Fees for International Application No. PCT/US2022/043912, Dec. 22, 2022, 10 pages.

(Continued)

*Primary Examiner* — Qi Han

(74) *Attorney, Agent, or Firm* — Weaver Austin Villeneuve & Sampson LLP

(57) ABSTRACT

An audio system for spatializing virtual sound sources is described. A microphone array of the audio system is configured to monitor sound in a local area. A controller of the audio system identifies sound sources within the local area using the monitored sound from the microphone array and determines their locations. The controller of the audio system generates a target position for a virtual sound source based on one or more constraints. The one or more constraints include that the target position be at least a threshold distance away from each of the determined locations of the identified sound sources. The controller generates one or more sound filters based in part on the target position to spatialize the virtual sound source. A transducer array of the audio system presents spatialized audio including the virtual sound source content based in part on the one or more sound filters.

20 Claims, 7 Drawing Sheets

(56) References Cited

U.S. PATENT DOCUMENTS

| | | | | |
|---|---|---|---|---|
| 2021/0006976 | A1 | 1/2021 | Swaminathan et al. | |
| 2021/0092546 | A1 * | 3/2021 | Terentiv .................. | H04S 7/303 |

OTHER PUBLICATIONS

International Search Report and Written Opinion for International Application No. PCT/US2022/043912, mailed Feb. 13, 2023, 15 pages.

* cited by examiner

AUDIO SYSTEM FOR SPATIALIZING VIRTUAL SOUND SOURCES

FIELD OF THE INVENTION

This disclosure relates generally to artificial reality systems, and more specifically to spatializing virtual sound sources.

BACKGROUND

One of the promises of augmented reality and/or mixed reality technologies is the ability to present virtual sound sources that are perceptually indistinguishable from sounds that occur naturally in a user's environment. In virtual reality, location of an acoustic source can be pre-defined by the rules of the virtual world in which the user is immersed. In augmented reality and/or mixed reality, the location of virtual sound sources can be bounded by the constraints of the user's physical world or can be presented to the user at arbitrary locations. In cases where the audio source can be placed freely by the software or hardware, the location of the virtual sound source relative to other sources of noise in the environment can impact the quality of the perceived virtual sound source and can decrease intelligibility. In other use cases, sound intelligibility may be impacted by characteristics of the sound such that intelligibility of the sound varies with placement.

SUMMARY

The audio system described herein is configured to spatialize virtual sound source sources for an immersive artificial reality experience. The audio system, in some embodiments, may be hosted by a headset having at least a sensor, audio transducer, and audio controller. In other embodiments, components the audio system may be spread across multiple connected devices such as a smartwatch, smartphone, and headphones. The audio system places virtual sound sources responsive to a set of constraints. The constraints may include, for example, that a position of a virtual sound source cannot be spatialized within a threshold distance of a sound source in a physical environment of the user or that a virtual sound source should be spatialized according to its spectral profile.

The audio system includes a microphone array, controller, and transducer array. The microphone array is two or more microphones that monitor sound in a local area. The local area may be an area in which the audio system can detect sound (e.g., a range of detection) or be bounded by physical constraints such as walls or geography. The controller receives the monitored sound from the microphone array, identifies sound sources within the local area, and determines the locations of the sound sources. The controller determines a target position for a virtual sound source based on constraints and generates a sound filter based on the target position. The transducer array presents spatialized audio content including the virtual sound source based in part on the sound filter such that the virtual sound source is presented at the target position.

In some embodiments the audio system is further configured to analyze the sound sources for characteristics such as spatial, time, frequency attributes, or some combination thereof. The characteristics of the sound sources may be used to generate constraints for the audio system. The audio system determines, based on the constraints, a target position at which to spatialize a virtual sound source. For example, in the use case of a conference call the audio system may determine the target position of the voices of the callers based on a spectral profile of each voice. The audio system may determine the target position for the virtual sound source based on multiple constraints.

The audio system performs a method of spatializing virtual sound sources. The method includes monitoring sound in the local area with the microphone array. Sound sources are identified in the local area using the monitored sound. The locations of the sound sources are determined. A target position at which to spatialize a virtual sound source is determined. The target position is based on one or more constraints, including that the target position is at least a threshold distance away from each of the determined locations of the sound sources in the local area. A sound filter is generated based on the target position. The sound filter may be applied to the virtual sound source to spatialize the virtual sound source. Spatialized audio content including the virtual sound source is presented based in part on the one or more sound filters.

In some embodiments, a non-transitory computer readable medium is configured to store program code instructions, that when executed by a processor of a device, cause the device to perform steps comprising monitoring sound in a local area via a microphone array. The monitored sound is processed to identify sound sources within the local area using the monitored sound, and the locations of the sound sources are determined. A target position at which to spatialize a virtual sound source is determined based on one or more constraints. A sound filter is generated based on the target position, and spatialized audio content including the virtual sound source is presented based in part on the sound filter.

Figure 1A:
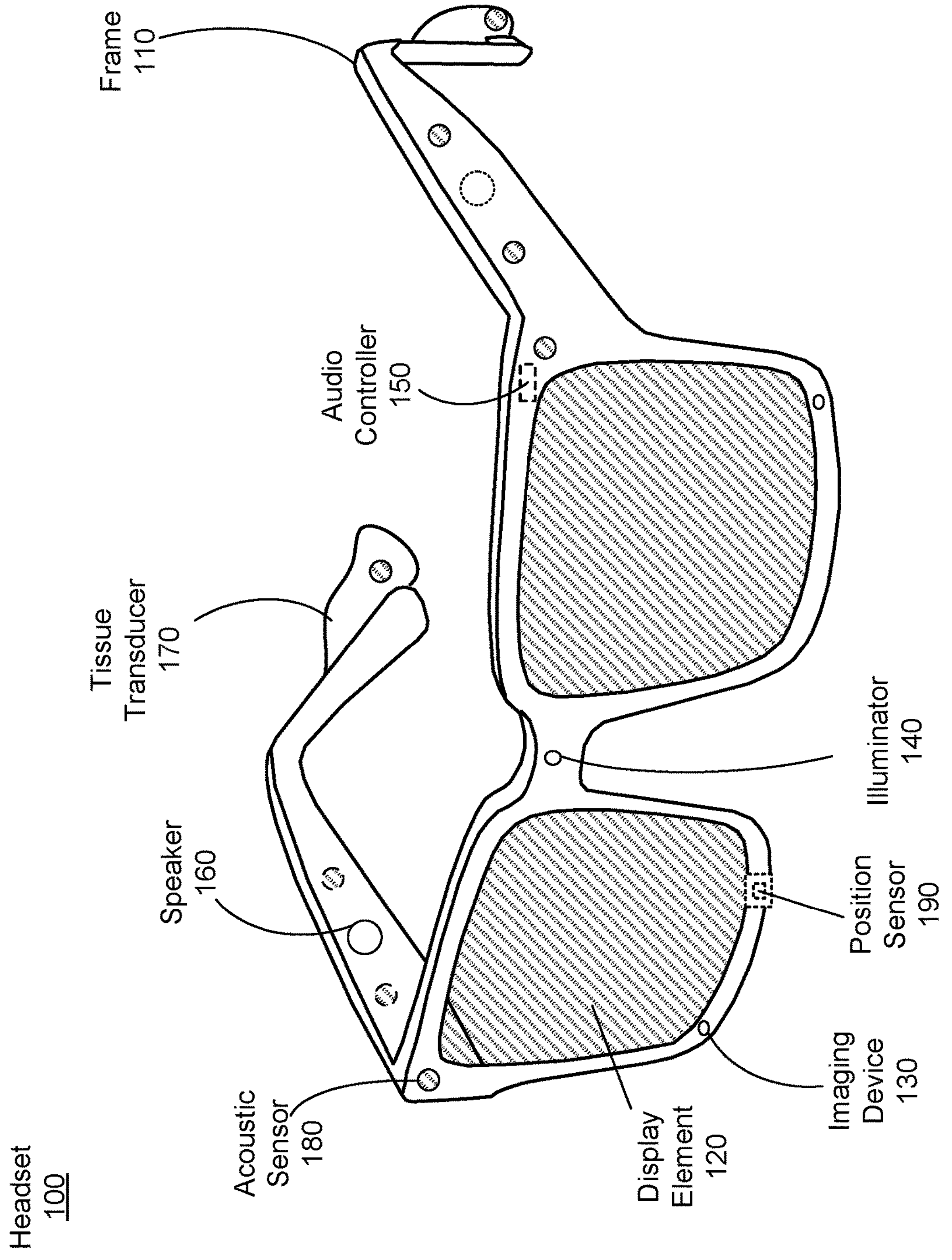
FIG. 1A is a perspective view of a headset implemented as an eyewear device, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

An audio system is described that intelligently spatializes virtual sound sources based on analysis on the time, frequency, and spatial characteristics of the physical sound field (e.g., sounds in a physical environment). The audio system may spatialize virtual sound sources in positions that reduce excess cognitive load and provide preferred intelligibility.

The audio system comprises a microphone array, controller, and transducer array. The microphone array monitors sound in a local area and communicates the sound data to the controller. The microphone array may be comprised of a plurality of audio sensors, each audio sensor having a range of detection in which the audio sensor can detect sound. The combination of the ranges of detection of each audio sensor of the microphone array comprise the local area in which the audio system monitors sound.

The controller of the audio system is configured to take the monitored sound and identify sound sources in the local area. The sound sources may be identified by the controller by comparing the transfer function of the monitored sound to transfer functions stored in a database that the controller can access. The transfer function may indicate that the sound source is a human voice or a noise caused by an object in the physical environment (local area) of the audio system. The controller determines the locations of the sound sources such as by direction of arrival analysis or analysis of the time difference in which the sound was received by separate sensors of the microphone array.

The controller determines a target position for a virtual sound source. The virtual sound source may be, for example, a virtual voice directing a user of the audio system to walk in a certain direction to reach their destination. Other examples of virtual sound sources may include sounds associated with an augmented reality game associated with the audio system and voices of participants on a conference call. The controller determines a target position for the virtual sound source to optimize intelligibility of the virtual sound source for a user of the audio system. The target position is determined based on one or more constraints including that the target position of the virtual sound source be at least a threshold distance away from each of the determined locations of the sound sources identified in the local area. Other constraints on the target position may be related to the use case of the audio system, for example, a conference call, game, or walking directions.

The controller generates a sound filter based on the determined target position. The sound filter is configured to spatialize the virtual sound source such that the filtered virtual sound source is perceived by the user of the audio system as coming from the target position. The sound filter may, for example, attenuate sounds at certain frequencies and amplify sounds at other frequencies to spatialize the virtual sound source. The controller sends instructions to a transducer array to present the spatialized audio content using the sound filter generated by the controller.

Furthermore, the system takes a current use case as input in order to determine a target location of a virtual sound source. For example, if a user is receiving map directions that are telling the user to turn left, it would be unintuitive to hear this command (i.e., a virtual sound source) coming from the right of the user, even if that is the best location based on the physical sound field. The audio system considers the constraints imposed by the use case and may instead spatialize the virtual sound source such that they appear to come from the front-left quadrant of the user.

Further, spatialized sound can greatly improve understanding of speech by a user in a multiple voice scenario. Placing each voice at different apparent spatial locations enables better differentiation of multiple speakers' voices and improves speech intelligibility. The audio system may use a ratio between low-frequency and high-frequency energy of each voice to select a target position along the horizontal plane (e.g., an azimuth angle). Voice characteristics with high energy at low frequencies may benefit more from large interaural time differences than voices exhibiting high energy at mid to high frequencies. As such the audio system may spatialize voices with high energy at low frequencies at a high azimuth angle relative to the median sagittal plane (shown in FIG. 5) of the head of the user of the audio system. A low frequency voice may be spatialized, for example, 70 degrees to the left of the median sagittal plane of the user such that the left ear of the user receives the sound of the voice before the right ear, creating a high ITD. Conversely, a high frequency voice, or a voice with high energy at high frequencies, may be spatialized at a low azimuth angle relative to the median sagittal plane of the user, such as 0 to 15 degrees to ensure that the virtual sound source reaches the ears of the user nearly simultaneously to create a low ITD.

The described audio system improves or in some embodiments optimizes the intelligibility of virtual sound sources relative to their spectral profile compared to similar artificial reality technologies. Other audio systems may spatialize virtual sound sources based on only virtual constraints and ignore constraints improved by the physical environment of the audio system. For example, in the case of a prior audio system hosting a game, the audio system may spatialize virtual sound sources of the game according to a virtual environment. The spatialized virtual sound source for the game may overlap with a real sound source in the physical environment of the audio system. The overlap of virtual and physical sound sources impedes the user's understanding of the sound and increases cognitive load of the user. By spatializing virtual sound sources based on frequency characteristics and constraints of the use case the instant audio system improves upon prior spatialization systems and creates a more comfortable and immersive experience for a user.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1A) and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The audio system provides audio content. The audio system includes a transducer array, a sensor array, and an audio controller 150 that are able to detect, monitor, track, and spatialize sound sources. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller 150 processes information from the sensor array that describes sounds detected by the sensor array. The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, beamform in the direction of sound sources, classify sound sources, generate sound filters for the speakers 160, or some combination thereof.

The audio controller 150 is further configured to spatialize virtual sound sources. The audio controller 150 may receive data from the sensor array (e.g., acoustic sensors 180) and create a mapping of sound sources in the local area of the audio system. The audio controller 150 may create a sound filter to spatialize a virtual sound source at a position that is not co-located with sound sources in the local area. The filtered and spatialized virtual sound source is output through the transducer array (e.g., speakers 160). The audio controller 150 may additionally receive input from the imaging devices 130 or position sensors 190 and process the input data to calculate the spatializing sound filter.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room. Additional details regarding the components of the headset 100 are discussed below in connection with FIG. 6.

Figure 1B:
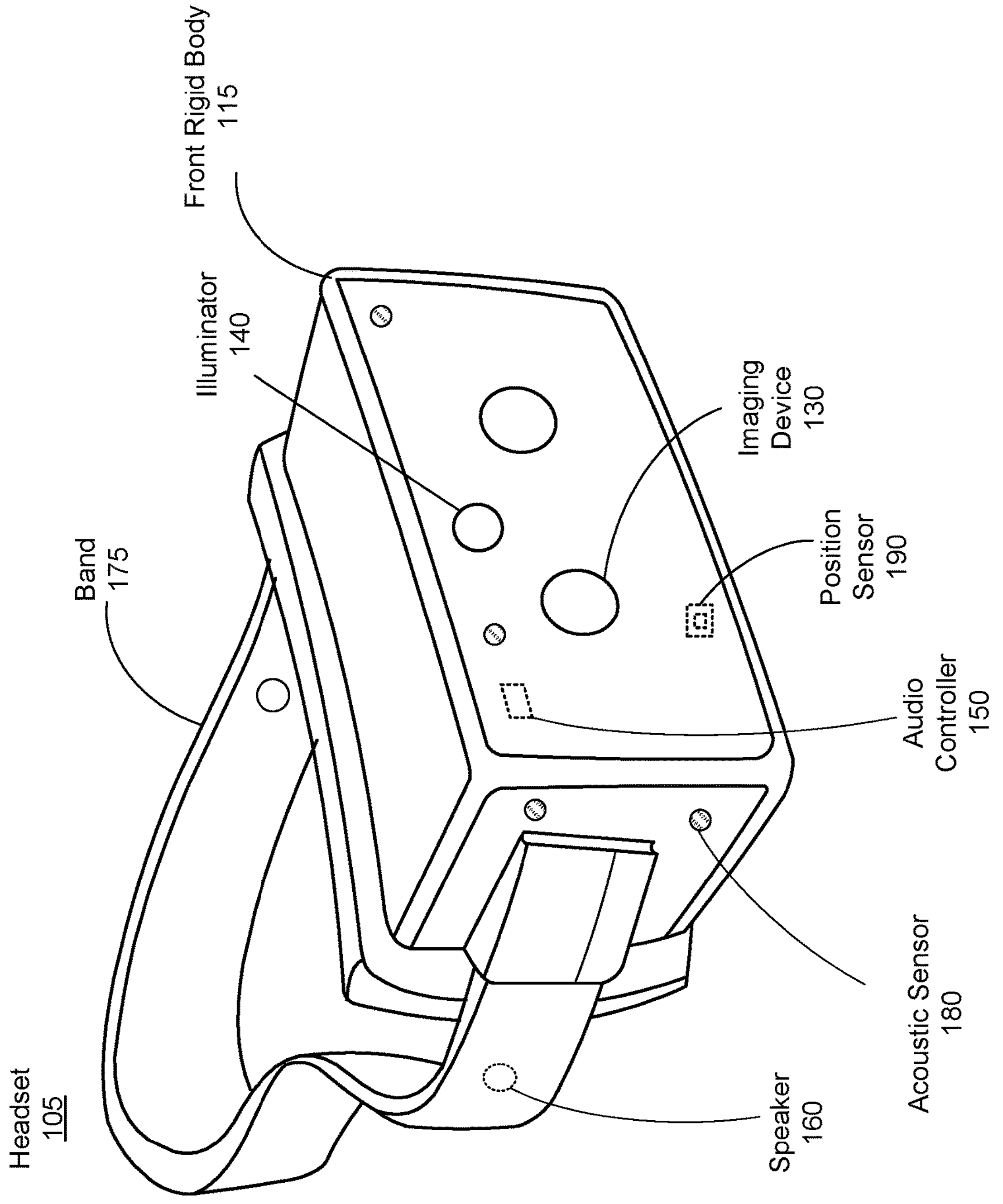
FIG. 1B is a perspective view of a headset implemented as a head-mounted display, in accordance with one or more embodiments.

FIG. 1B is a perspective view of a headset 105 implemented as an HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A but modified to integrate with the HMD form factor. For example, the HMD includes a display assembly, a DCA, an audio system, and a position sensor 190. FIG. 1B shows the illuminator 140, a plurality of the speakers 160, a plurality of the imaging devices 130, a plurality of acoustic sensors 180, and the position sensor 190. The speakers 160 may be located in various locations, such as coupled to the band 175 (as shown), coupled to front rigid body 115, or may be configured to be inserted within the ear canal of a user.

The audio system, further described with reference to FIG. 2, uses the hardware components of headset 100/105 to determine a location at which to spatialize virtual sound sources. The imaging device 130 may be used by the audio system to capture images of the physical environment. The images are used to map the physical environment of the user wearing the headset. Objects in the physical environment may be mapped in a virtual grid such that the audio system avoids placing virtual sound sources at the coordinates of the physical objects. The acoustic sensor 180 may detect sound sources in the physical environment (e.g., within a local area that is the area of detection of the sensor 180) so that the audio system can identify which physical objects are physical sound sources, as described in FIG. 4. The audio controller 150 receives sensor data from the imaging device 130 and acoustic sensor 180 and calculates the target position at which to spatialize a virtual sound source. The audio controller 150 applies one or more filters to the virtual sound source in order to generate spatialized audio content virtual sound source. The transducer array presents the spatialized audio content to the user. Spatialized audio content is audio content that appears to originate from a particular direction and/or target region (e.g., an object in the local area and/or a virtual object).

Figure 2:
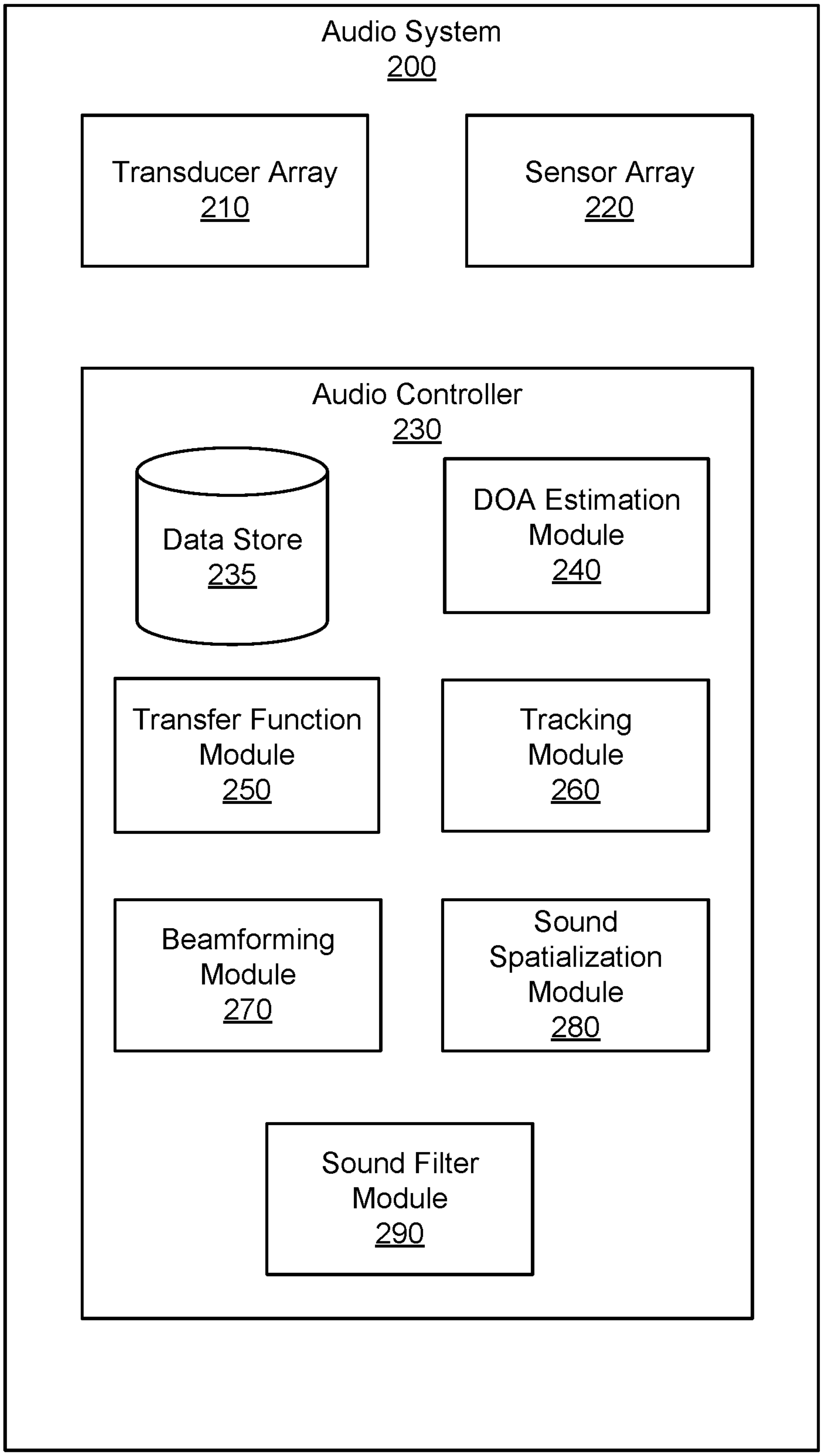
FIG. 2 is a block diagram of an audio system, in accordance with one or more embodiments.

FIG. 2 is a block diagram of an audio system 200 configured to spatialize virtual sound sources, in accordance with one or more embodiments. The audio system in FIG. 1A or FIG. 1B may be an embodiment of the audio system 200. The audio system 200 generates one or more acoustic transfer functions for a user. The audio system 200 may then use the one or more acoustic transfer functions to generate audio content for the user. In the embodiment of FIG. 2, the audio system 200 includes a transducer array 210, a sensor array 220, and an audio controller 230. Some embodiments of the audio system 200 have different components than those described here. Similarly, in some cases, functions can be distributed among the components in a different manner than is described here.

The transducer array 210 is configured to present audio content. The transducer array 210 includes a plurality of transducers. A transducer is a device that provides audio content including spatialized virtual sound sources. A transducer may be, e.g., a speaker (e.g., the speaker 160), a tissue transducer (e.g., the tissue transducer 170), some other device that provides audio content, or some combination thereof. A tissue transducer may be configured to function as a bone conduction transducer or a cartilage conduction transducer. The transducer array 210 may present audio content via air conduction (e.g., via one or more speakers), via bone conduction (via one or more bone conduction transducer), via cartilage conduction audio system (via one or more cartilage conduction transducers), or some combination thereof. In some embodiments, the transducer array

210 may include one or more transducers to cover different parts of a frequency range. For example, a piezoelectric transducer may be used to cover a first part of a frequency range and a moving coil transducer may be used to cover a second part of a frequency range.

The bone conduction transducers generate acoustic pressure waves by vibrating bone/tissue in the user's head. A bone conduction transducer may be coupled to a portion of a headset and may be configured to be behind the auricle coupled to a portion of the user's skull. The bone conduction transducer receives vibration instructions from the audio controller 230 and vibrates a portion of the user's skull based on the received instructions. The vibrations from the bone conduction transducer generate a tissue-borne acoustic pressure wave that propagates toward the user's cochlea, bypassing the eardrum.

The cartilage conduction transducers generate acoustic pressure waves by vibrating one or more portions of the auricular cartilage of the ears of the user. A cartilage conduction transducer may be coupled to a portion of a headset and may be configured to be coupled to one or more portions of the auricular cartilage of the ear. For example, the cartilage conduction transducer may couple to the back of an auricle of the ear of the user. The cartilage conduction transducer may be located anywhere along the auricular cartilage around the outer ear (e.g., the pinna, the tragus, some other portion of the auricular cartilage, or some combination thereof). Vibrating the one or more portions of auricular cartilage may generate: airborne acoustic pressure waves outside the ear canal; tissue born acoustic pressure waves that cause some portions of the ear canal to vibrate thereby generating an airborne acoustic pressure wave within the ear canal; or some combination thereof. The generated airborne acoustic pressure waves propagate down the ear canal toward the ear drum.

The transducer array 210 generates audio content in accordance with instructions from the audio controller 230. In some embodiments, the audio content is spatialized. Spatialized audio content is audio content that appears to originate from a particular direction and/or target region (e.g., an object in the local area and/or a virtual object). For example, spatialized audio content can make it appear that sound is originating from a virtual singer across a room from a user of the audio system 200. The transducer array 210 may receive instructions from the sound spatialization module 280 and sound filter module 290 to provide filtered or spatialized sound. The transducer array 210 may be coupled to a wearable device (e.g., the headset 100 or the headset 105). In alternate embodiments, the transducer array 210 may be a plurality of speakers that are separate from the wearable device (e.g., coupled to an external console).

The sensor array 220 detects and monitors sounds within a local area surrounding the sensor array 220. The local area may comprise a range of detection of the sensor array 220. The sensor array 220 may include a plurality of acoustic sensors that each detect air pressure variations of a sound wave and convert the detected sounds into an electronic format (analog or digital). The plurality of acoustic sensors may be positioned on a headset (e.g., headset 100 and/or the headset 105), on a user (e.g., in an ear canal of the user), on a neckband, or some combination thereof. An acoustic sensor may be, e.g., a microphone, a vibration sensor, an accelerometer, or any combination thereof. In some embodiments, the sensor array 220 is configured to monitor the audio content generated by the transducer array 210 using at least some of the plurality of acoustic sensors. Increasing the number of sensors may improve the accuracy of information (e.g., directionality) describing a sound field produced by the transducer array 210 and/or sound from the local area.

The audio controller 230 controls operation of the audio system 200. In the embodiment of FIG. 2, the audio controller 230 includes a data store 235, a DOA estimation module 240, a transfer function module 250, a tracking module 260, a beamforming module 270, sound spatialization module 280, and a sound filter module 290. The audio controller 230 may be located inside a headset, in some embodiments. Some embodiments of the audio controller 230 have different components than those described here. Similarly, functions can be distributed among the components in different manners than described here. For example, some functions of the controller may be performed external to the headset. The user may opt in to allow the audio controller 230 to transmit data captured by the headset to systems external to the headset, and the user may select privacy settings controlling access to any such data.

The data store 235 stores data for use by the audio system 200. Data in the data store 235 may include sounds recorded in the local area of the audio system 200, audio content, head-related transfer functions (HRTFs), transfer functions for one or more sensors, array transfer functions (ATFs) for one or more of the acoustic sensors, locations of sound sources, locations of virtual sound sources, virtual models of local area, direction of arrival estimates, sound filters, spectral profiles, spectral profiles of sound sources, constraints for spatialization, use cases, and other data relevant for use by the audio system 200, or any combination thereof. For example, the data store 235 may store spectral profiles describing the frequency content of sounds or voices that the audio system 200 has captured. The data store 235 may also store location data of the audio system 200.

The user may opt-in to allow the data store 235 to record data captured by the audio system 200. In some embodiments, the audio system 200 may employ always on recording, in which the audio system 200 records all sounds captured by the audio system 200 in order to improve the experience for the user such as by allowing the audio system to recognize sound sources by their previously recorded transfer functions. The user may opt in or opt out to allow or prevent the audio system 200 from recording, storing, or transmitting the recorded data to other entities.

The DOA estimation module 240 is configured to localize sound sources in the local area based in part on information from the sensor array 220. Localization is a process of determining where sound sources are located relative to the user of the audio system 200. The DOA estimation module 240 performs a DOA analysis to localize one or more sound sources within the local area. The DOA analysis may include analyzing the intensity, spectra, and/or arrival time of each sound at the sensor array 220 to determine the direction from which the sounds originated. In some cases, the DOA analysis may include any suitable algorithm for analyzing a surrounding acoustic environment in which the audio system 200 is located. The DOA estimation module 240 may be used to detect the position of objects and sound sources in the physical environment of the audio system 200 such that the audio controller 230 can set a constraint to avoid spatializing virtual sound sources at the same position as the physical objects or sound sources.

For example, the DOA analysis may be designed to receive input signals from the sensor array 220 and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. A least mean squared (LMS) algorithm may also be implemented to create an adaptive filter. This adaptive filter may then be used to identify differences in signal intensity, for example, or differences in time of arrival. These differences may then be used to estimate the DOA. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct path audio signal. Those bins having a portion of the direct-path signal may then be analyzed to identify the angle at which the sensor array 220 received the direct-path audio signal. The determined angle may then be used to identify the DOA for the received input signal. Other algorithms not listed above may also be used alone or in combination with the above algorithms to determine DOA.

In some embodiments, the DOA estimation module 240 may also determine the DOA with respect to an absolute position of the audio system 200 within the local area. The position of the sensor array 220 may be received from an external system (e.g., some other component of a headset, an artificial reality console, a mapping server, a position sensor (e.g., the position sensor 190), etc.). The external system may create a virtual model of the local area, in which the local area and the position of the audio system 200 are mapped. The received position information may include a location and/or an orientation of some or all of the audio system 200 (e.g., of the sensor array 220). The DOA estimation module 240 may update the estimated DOA based on the received position information.

The transfer function module 250 is configured to generate one or more acoustic transfer functions. Generally, a transfer function is a mathematical function giving a corresponding output value for each possible input value. Based on parameters of the detected sounds, the transfer function module 250 generates one or more acoustic transfer functions associated with the audio system. The acoustic transfer functions may be array transfer functions (ATFs), head-related transfer functions (HRTFs), other types of acoustic transfer functions, or some combination thereof. An ATF characterizes how the microphone receives a sound from a point in space.

An ATF includes a number of transfer functions that characterize a relationship between the sound source and the corresponding sound received by the acoustic sensors in the sensor array 220. Accordingly, for a sound source there is a corresponding transfer function for each of the acoustic sensors in the sensor array 220. And collectively the set of transfer functions is referred to as an ATF. Accordingly, for each sound source there is a corresponding ATF. Note that the sound source may be, e.g., someone or something generating sound in the local area, the user, or one or more transducers of the transducer array 210. The ATF for a particular sound source location relative to the sensor array 220 may differ from user to user due to personal anatomy (e.g., ear shape, shoulders, etc.) that affects the sound as it travels to the ears of the user. Accordingly, the ATFs of the sensor array 220 are personalized for each user of the audio system 200.

In some embodiments, the transfer function module 250 determines one or more HRTFs for a user of the audio system 200. The transfer function module 250 may determine the HRFT of the user of the audio system to filter sound sources more accurately for spatialization. The HRTF characterizes how an ear receives a sound from a point in space. The HRTF for a particular source location relative to a person is unique to each ear of the person (and is unique to the person) due to the anatomy of the person (e.g., ear shape, shoulders, etc.) that affects the sound as it travels to the ears of the person. The HRFT may represent the transfer function of the user aligned with the median sagittal plane of the user. In other words, the HRFT represents the transfer function of sounds the user emits along the median sagittal plane. In some embodiments, the transfer function module 250 may determine HRTFs for the user using a calibration process. In some embodiments, the transfer function module 250 may provide information about the user to a remote system. The user may adjust privacy settings to allow or prevent the transfer function module 250 from providing the information about the user to any remote systems. The remote system determines a set of HRTFs that are customized to the user using, e.g., machine learning, and provides the customized set of HRTFs to the audio system 200.

The tracking module 260 is configured to track locations of one or more sound sources. The tracking module 260 may compare current DOA estimates and compare them with a stored history of previous DOA estimates. In some embodiments, the audio system 200 may recalculate DOA estimates on a periodic schedule, such as once per second, or once per millisecond. The tracking module may compare the current DOA estimates with previous DOA estimates, and in response to a change in a DOA estimate for a sound source, the tracking module 260 may determine that the sound source moved. In some embodiments, the tracking module 260 may detect a change in location based on visual information received from the headset or some other external source. The tracking module 260 may track the movement of one or more sound sources over time. In the case of sound spatialization, the tracking module 260 may track sounds sources in the local area of the audio system 200 and create a mapping of their locations. The mapping may be used by the sound spatialization module 280 to avoid co-locating virtual sound sources with sound sources present in the local area. The tracking module 260 may store values for a number of sound sources and a location of each sound source at each point in time. In response to a change in a value of the number or locations of the sound sources, the tracking module 260 may determine that a sound source moved. The tracking module 260 may calculate an estimate of the localization variance. The localization variance may be used as a confidence level for each determination of a change in movement.

The beamforming module 270 is configured to process one or more ATFs to selectively emphasize sounds from sound sources within a certain area while de-emphasizing sounds from other areas. In analyzing sounds detected by the sensor array 220, the beamforming module 270 may combine information from different acoustic sensors to emphasize sound associated from a particular region of the local area while deemphasizing sound that is from outside of the region. The beamforming module 270 may isolate an audio signal associated with sound from a particular sound source from other sound sources in the local area based on, e.g., different DOA estimates from the DOA estimation module 240 and the tracking module 260. The beamforming module 270 may thus selectively analyze discrete sound sources in the local area. In some embodiments, the beamforming module 270 may enhance a signal from a sound source. For example, the beamforming module 270 may apply sound filters which eliminate signals above, below, or between certain frequencies. Signal enhancement acts to enhance sounds associated with a given identified sound source relative to other sounds detected by the sensor array 220.

The sound spatialization module 280 of the audio system 200 determines a target position at which to place a virtual sound source. The placement of the virtual sound source may be chosen based on constraints to optimize intelligibility of the sound or immersivity of an AR experience. The constraints may be based on a use case that is identified by the sound spatialization module 280 with data from the audio system 200 or headset. For example, a user of the audio system may activate a mode in which the audio system is providing navigational prompts to the user. The activation of this mode is communicated to the sound spatialization module 280 as the identified use case. The sound spatialization module may access a database of constraints related to the identified use case in order to generate spatialized virtual sound sources. For example, constraints associated with navigational prompts may include that the prompt sound is spatialized in the direction in which the user should travel. Some use cases may have multiple associated constraints in which case the constraints may be weighted or ranked in order of importance to avoid conflicting constraints. Constraints may also be based on factors other than use case such as the physical environment of the audio system.

The sound spatialization module 280 may communicate with the tracking module 260 to update the location of sound sources as they change and in response update the locations in which virtual sound sources should be spatialized. For example, the sound spatialization module 280 may have a constraint that virtual sound sources should not be co-located with or within a threshold distance of objects and sound sources in the physical environment. The module 280 may therefore change the position at which it spatializes virtual sound sources as sound sources in the physical environment change position. The sound spatialization module 280 may use the transfer function module 250 to create transfer functions of sound sources or in conjunction with the sound filter module 290 to calculate a transfer function of a sound filter for spatializing a virtual sound source.

In another use case involving a conference call, the sound spatialization module 280 may spatialize virtual sound sources (e.g., call participant voices) based on constraints to improve intelligibility. Before the conference call, the audio system may collect spectral profiles of conference call participants that the user of the audio system has previously been in a conference call with. The audio system may store a spectral profile for one or more contacts of the user. The spectral profiles may be calculated by the audio system or may be transmitted by audio systems of other call participants to the audio system of the user. Likewise, the audio system may transmit the spectral profile of the user to other audio systems of the call participants. The spectral profile describes a spectrum of audio frequencies present in a voice of call participant. The spectral profile may be used by the sound spatialization module 280 to set constraints. Further, the audio system may also calculate a high frequency to low frequency (HF/LF) ratio of each voice.

The sound spatialization module 280 spatializes the virtual sound sources of the call participants based on their spectral profiles, HF/LF ratio, or some combination thereof. The audio system analyzes the spectral profiles to characterize the frequencies present in the voices and determines, based on the spectral profile, an angle at which to spatialize the virtual sound source comprising the voice. The analysis of the spectral profiles may include mapping the spectral profiles in comparison to each other. For example, the spectral profiles may be ranked according to their HF/LF values. Each voice may then be spatialized according to the ranking such that voices having spectral profiles with high HF/LF values are spatialized at positions that incur a low ITD and voices having low HF/LF values are spatialized at positions that incur a higher ITD. In this embodiment, the call participant with the highest frequency voice may be spatialized closest to the median sagittal plane of the user while other participants may be spatialized at higher azimuth angles, and thus further from the median sagittal plane of the user. In the situation that multiple call participants have spectral profiles with similar HF/LF values, the voices of those call participants may be spatialized at a set distance from each other to avoid overlap of the virtual sounds associated with their voices. For example, the sound spatialization module 280 may follow a constraint to spatialize all virtual sounds with at least 10 degrees of separation in their azimuth angles.

Once the conference call begins, call participants with unknown spectral profiles may be spatialized to a default position until the audio system calculates their spectral profiles. Call participants with known spectral profiles are spatialized to target azimuth angles based on their spectral profiles. The target angles may be updated throughout the call if the spectral profile is noted by the audio system to have changed slightly or if multiple call participants have similar spectral profiles and need to be re-spatialized to avoid co-locating the virtual sound sources of multiple call participants. In some embodiments, the spectral profiles of the call participants are mapped or graphed based on characteristics of the spectral profile. In a variety of embodiments, the mapping between take multiple shapes (e.g., linear, S-shaped) based on the characteristic being graphed, however the relationship between each spectral profile remains monotonic.

The placement of conference call participants is further described with reference to FIG. 5.

The sound filter module 290 generates sound filters for the transducer array 210. In some embodiments, the sound filters cause the audio content to be spatialized, such that the audio content appears to originate from a target region. The sound filter module 290 may use HRTFs and/or acoustic parameters to generate the sound filters. The acoustic parameters describe acoustic properties of the local area. The acoustic parameters may include, e.g., a reverberation time, a reverberation level, a room impulse response, etc. In some embodiments, the sound filter module 290 calculates one or more of the acoustic parameters. In some embodiments, the sound filter module 290 requests the acoustic parameters from a mapping server (e.g., as described below with regard to FIG. 6). The sound filter module 290 provides the sound filters to the transducer array 210. In some embodiments, the sound filters may cause positive or negative amplification of sounds as a function of frequency.

Figure 3:
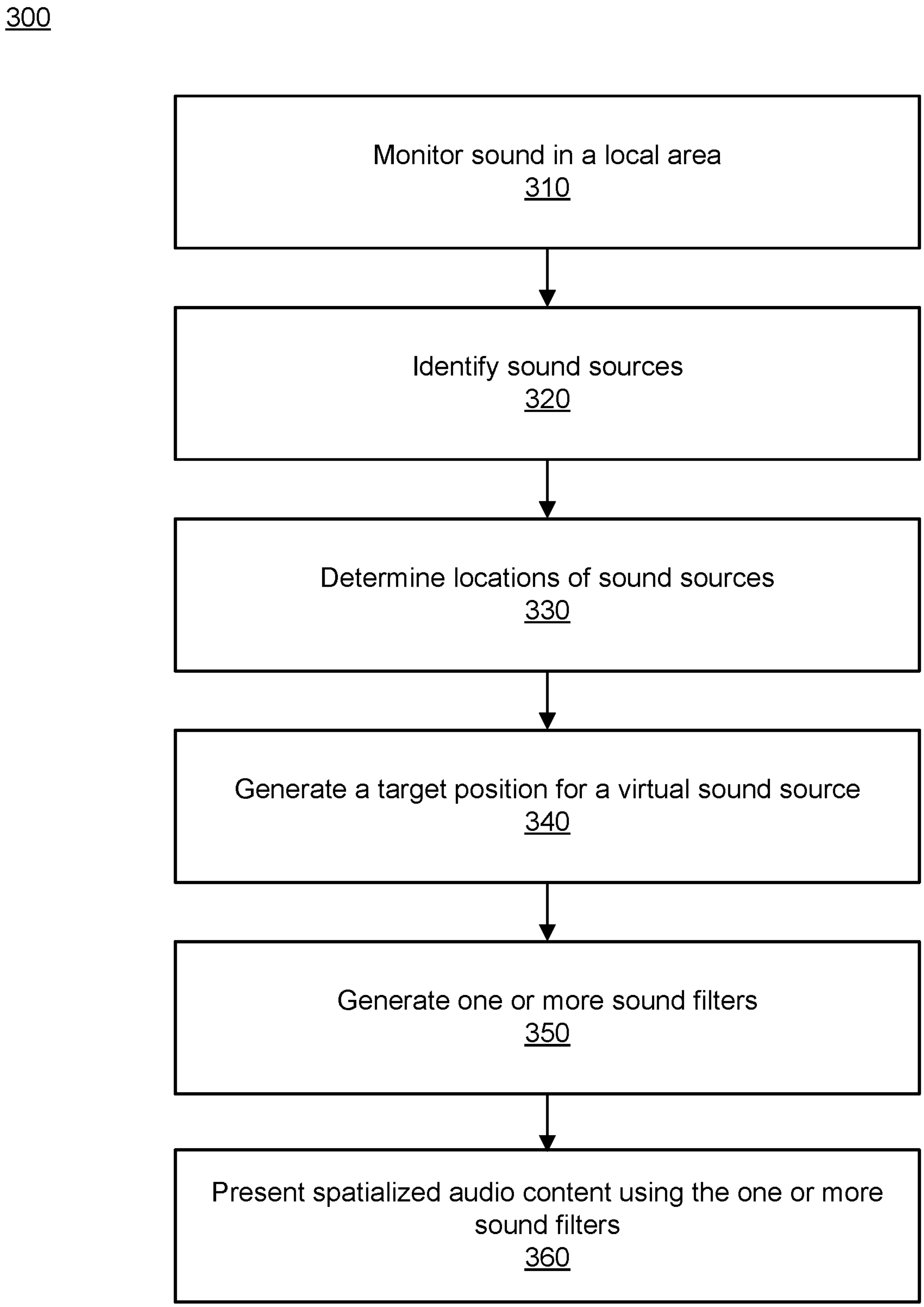
FIG. 3 is a flowchart illustrating a process for spatializing audio content, in accordance with one or more embodiments.

FIG. 3 is a flowchart illustrating a process for spatializing audio content, in accordance with one or more embodiments. The process 300 shown in FIG. 3 may be performed by components of an audio system (e.g., audio system 200). Other entities may perform some or all of the steps in FIG. 3 in other embodiments. Embodiments may include different and/or additional steps or perform the steps in different orders.

The audio system 200 monitors 310 sound in a local area using a microphone array. The microphone array may be configured to be always on when the audio system 200 is in use or may sample for an interval of time at a set frequency. The audio system 200 may be configured to only collect audio data that is above a specific decibel range such that it is conducive to further processing. For examples, sound sources that are too quiet may not be processed by the audio system.

The audio system 200 identifies 320 sound sources in the local area. An audio controller (e.g., audio controller 150) may be configured to take the samples collected by the microphone array and process the audio data. The audio data from the microphone array may be analyzed for spatial, time, or frequency characteristics. In some embodiments, the audio controller may compare the audio data to data previously received by the microphone array and stored locally in the device (e.g., headset 100/105) or at a server in communication with the device.

The audio system 200 determines 330 the locations of the sound sources in the local area. The locations of the sound sources may be determined from data collected via an imaging system (e.g., imaging device 130), a depth camera assembly, sound captured by the microphone array, or some combination thereof. The data collected from the imaging system, DCA, microphone array, or some combination thereof, is processed by the controller of the audio system 200 such as by DOA analysis or image processing to determine the locations of sound sources. Responsive to determining the locations of sound sources in the local area, the audio system may set a constraint dictating that the target position of a virtual sound source is not co-located or within a threshold distance of a sound source. The audio system may additionally set a constraint to not position virtual sound sources within a threshold distance of objects detected in the local area that are not identified as sound sources.

The audio system 200 generates 340 a target position for a virtual sound source based on one or more constraints. The one or more constraints include that the target position is at least a threshold distance away from each of the determined locations of the identified sound sources. The audio system may additionally identify a use case and select constraints based in part on the identified use case. Use cases and related constraints are further described with reference to FIGS. 2, 4 and 5. The audio system may have multiple constraints for a specific use case, in this situation the audio system may rank or weight the constraints to determine a target position.

The audio system 200 generates 350 one or more sound filters based in part on the target position. The sound filters augment or attenuate characteristics of the virtual sound source to make it seem as though the virtual sound source is at a particular location. Applying the sound filter to the virtual sound source may involve computation such as convolving the transfer function of the virtual sound source with the transfer function of the filter. Other computations may also be used.

The audio system 200 presents 360 spatialized audio content using the one or more sound filters. Once the filtered virtual sound source is generated the audio system presents it as spatialized audio content to the user via a transducer array.

In some embodiments, once the spatialized audio content has been presented the audio system may reevaluate the position of the virtual sound source and make changes to correct error and/or adapt to a change in environment.

Figure 4:
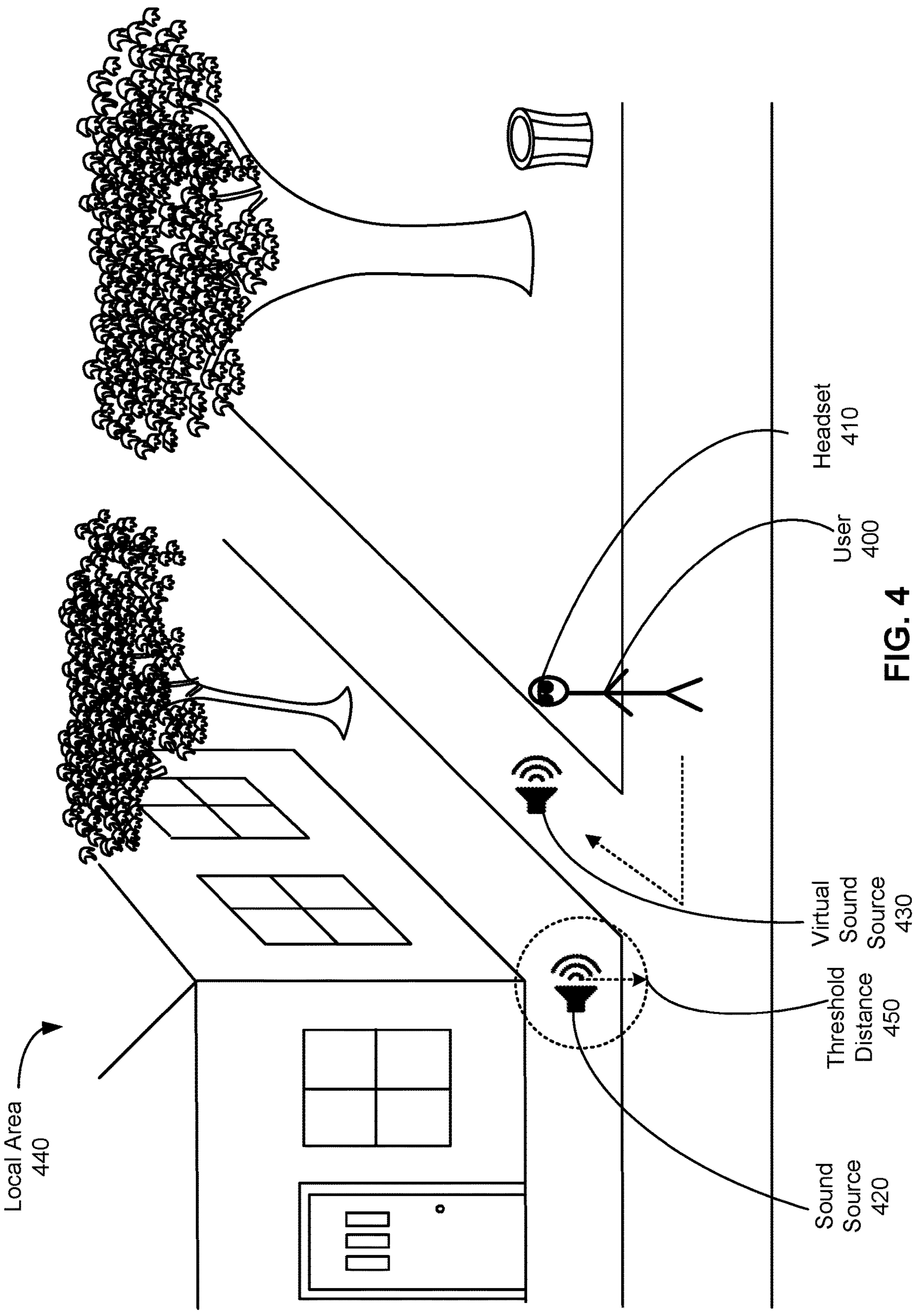
FIG. 4 is an example use case of an audio system, in accordance with one or more embodiments.

FIG. 4 is an example use case of the audio system wherein the audio system is being used to give navigational prompts to a user, in accordance with one or more embodiments. The illustrated use case of FIG. 4 includes a user 400 wearing a headset 410 (such as headset 100 or 105) while moving through a physical environment. The audio system (such as audio system 200) of the headset 410 can monitor sound in a local area 440. In the shown use case, the user 400 may be receiving walking directions from the headset 410. For example, the headset may spatialize a virtual sound source 430 that is a voice instructing the user 400 to turn right to reach their destination.

The audio system 200 spatializes the virtual sound source 430 in the local area 440 subject to one or more constraints. For example, one constraint may be that a virtual sound source is not spatialized within a threshold distance 450 of (e.g., co-located with) a sound source 420. The threshold distance 450 is at least a distance at which a user is able to resolve sound as coming from the sound source or coming from the virtual source. Another constraint may be to spatialize the virtual sound source 430 in a target position in a direction corresponding to the navigational prompts the user is receiving. For example, as shown in FIG. 4, the audio system 200 uses the virtual sound source 430 to instruct the user to turn right, and the virtual sound source 430 is spatialized to the right of the user).

In some embodiments the constraints may have weights or preferences associated with them such that if any constraints conflict the audio system 200 can choose a constraint to follow. As shown, the constraint to spatialize the virtual sound source in the direction the user should walk is followed and the virtual sound source 430 is placed to the right of the user as the virtual sound source 430 instructs the user 400 to turn right. The virtual sound source in this configuration may be within the threshold distance 450 of the physical sound source 420, such as a bird chirping, in the same direction from the perspective of the user. In some embodiments the audio system may re-evaluate the physical environment after placing the virtual sound source and make small spatial adjustments as needed for intelligibility and reducing cognitive load.

Figure 5:
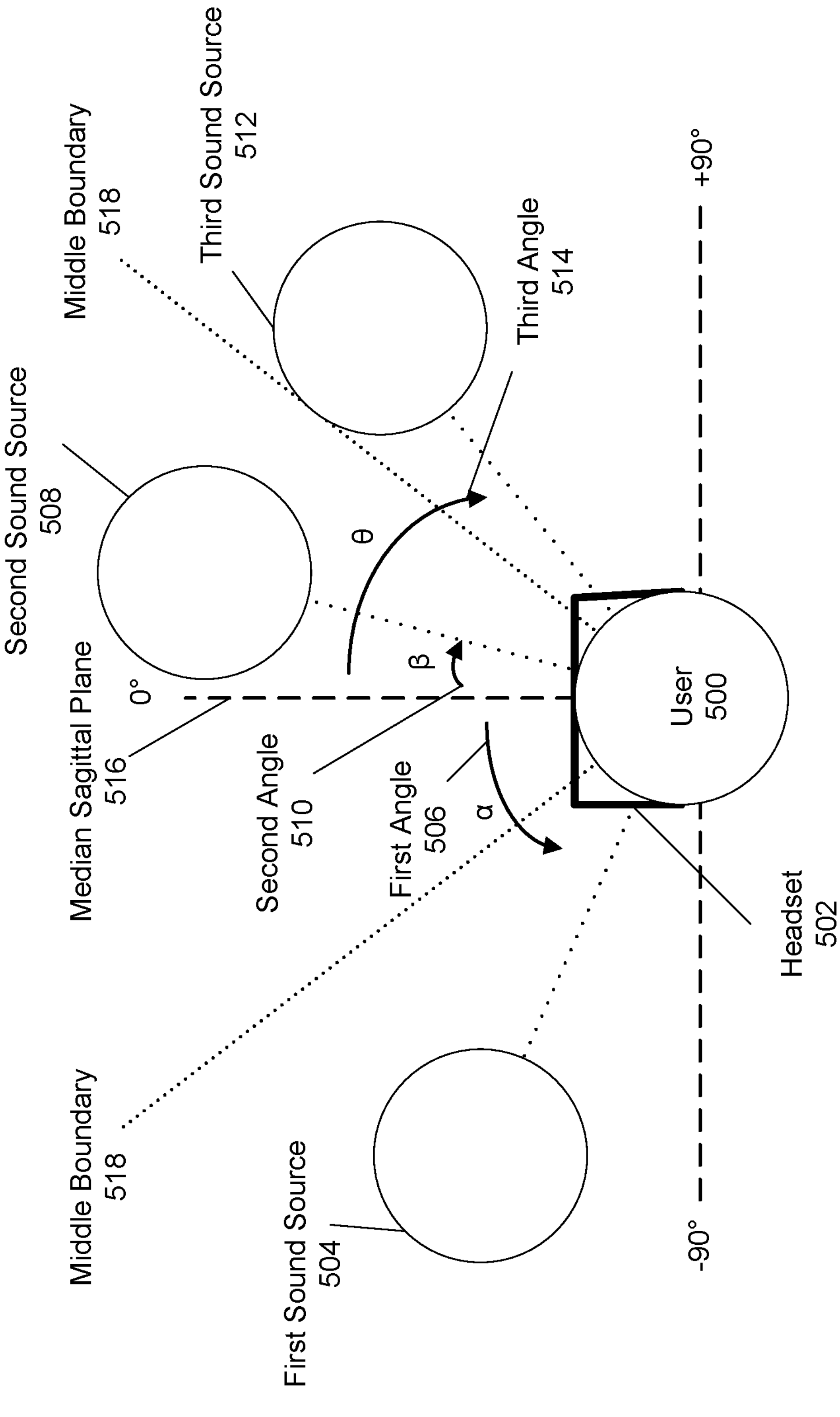
FIG. 5 is an aerial view of spatialized sound sources in a use case of an audio system, in accordance with one or more embodiments.

FIG. 5 is a top down view of a user 500 in a conference call with a plurality of conference participants represented as spatialized virtual sound sources, in accordance with one or more embodiments. As illustrated, an audio system (e.g., the audio system 200) of a headset 502 is facilitating a conference call between the user 500 and a plurality conference participants. The audio system (such as audio system 200) of the headset 500 determines the spectral profile of each voice. The spectral profile of each voice may be determined by a separate audio system used by a conference call participant. The audio system(s) used by the call participant(s) may determine the spectral profile the user and transmit the spectral profile to the audio systems used by the other call participants. In some embodiments each call participant may indicate privacy preferences determining whether or not their spectral profile can be transmitted to other audio systems.

The first sound source 504 (e.g., a voice of multiple voices in a conference call scenario) is determined to have a low HF/LF ratio and therefore may be more intelligible when spatialized with a high ITD resulting in a more lateral location. The audio system spatializes sound source 504 at a first angle 506 relative to a median sagittal plane 516 of the user 500. The first angle 506 is at an azimuth greater than a middle boundary 518 for sound source 504. The second sound source 508 is determined to have high HF/LF ratio and is therefore filtered into a virtual sound source such that it is spatialized at a second angle 506 at an azimuth between the median sagittal plane 516 and the middle boundary 518. The third sound source 512 is determined to have a HF/LF ratio that is close to (e.g., within +/−10%) 1. The third sound source 512 is therefore filtered into a virtual sound source such that it is spatialized at a third angle 514 having an azimuth at or within a threshold (such as within +/−10 degrees) of the middle boundary 518.

In some embodiments, the audio system may spatialize the virtual sound sources at a fixed distance (e.g., radial distance) away from the user 500 based on a conventional conversation distance or other use case constraints. In other embodiments the audio system may spatialize the virtual sound sources at varying distances from the user 500 such as in the use case of a multi-player game in which players are varying distances away from the user 500 in-game. The audio system may additionally have a threshold distance at which it spatializes virtual sound sources away from each other. In this case, if two participants of a conference call have voices with similar spectral profiles the audio system can spatialize them a threshold distance apart (e.g., 10 degrees) such that the voices are distinguishable). In the event that there are too many call participants to arrange at azimuth angles relative to the user without overlap, the audio system may also spatialize the virtual sound sources at varying elevations relative to the user.

The audio system may spatialize sound sources at a fixed elevation in a multiple voice conference call use case. The virtual sound sources may be spatialized at the determined angle and aligned on the same elevation as the headset 502, mimicking the conference call participants all speaking from approximately the same height. In other embodiments the audio system may choose an elevation at which to spatialize each virtual sound source based on constraints. For example, the use case may be a virtual presentation in which the user and other sound sources are aligned at a lower elevation than that of the presenter, to mimic the presenter standing to speak to a seated group.

Depending on constraints such as use case the audio system may spatialize virtual sound sources such that they are fixed to the field of view of the user or to the physical environment. For example, in the use case of FIG. 4 of receiving walking directions, once the virtual sound source is spatialized the virtual sound source may be fixed to the environment in a world-centric arrangement. The world-centric arrangement is such that, even if the user turns away from the virtual sound source, the virtual sound source will remain at the same position in the user's physical environment, demonstrating which direction the user should go. In the conference call use case of FIG. 5, the virtual sound sources may be unrelated to the user's physical environment and therefore should be fixed relative to the field of view of the user in a head-centric arrangement. The head-centric arrangement is such that, even if the user turns their head, the virtual sound sources will translate with the motion of the user to remain at positions relative to the median sagittal plane of the user that improve intelligibility.

Figure 6:
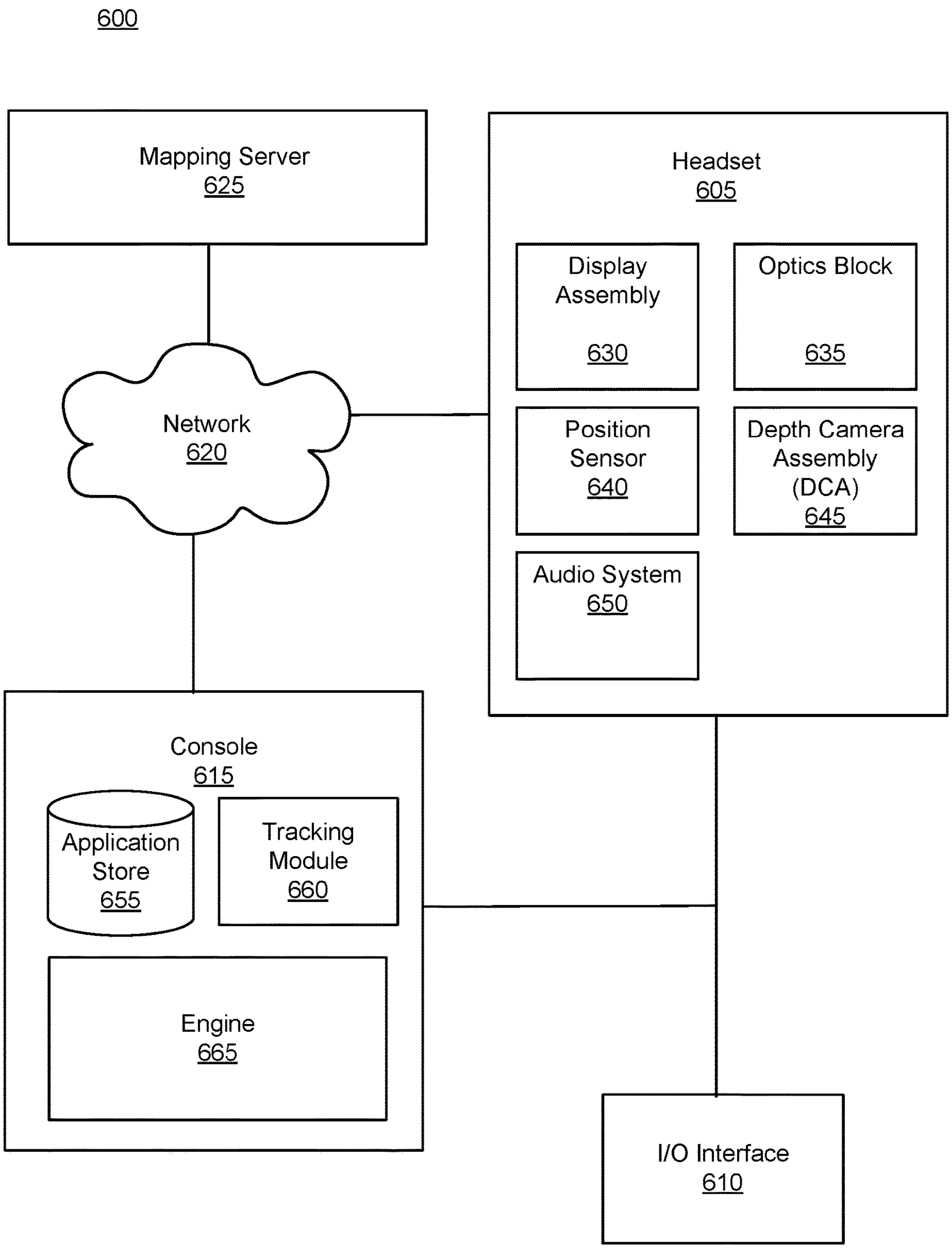
FIG. 6 is a system that includes a headset, in accordance with one or more embodiments.

FIG. 6 is a system 600 that includes a headset 605, in accordance with one or more embodiments. In some embodiments, the headset 605 may be the headset 100 of FIG. 1A or the headset 105 of FIG. 1B. The system 600 may operate in an artificial reality environment (e.g., a virtual reality environment, an augmented reality environment, a mixed reality environment, or some combination thereof). The system 600 shown by FIG. 6 includes the headset 605, an input/output (I/O) interface 610 that is coupled to a console 615, the network 620, and the mapping server 625. While FIG. 6 shows an example system 600 including one headset 605 and one I/O interface 610, in other embodiments any number of these components may be included in the system 600. For example, there may be multiple headsets each having an associated I/O interface 610, with each headset and I/O interface 610 communicating with the console 615. In alternative configurations, different and/or additional components may be included in the system 600. Additionally, functionality described in conjunction with one or more of the components shown in FIG. 6 may be distributed among the components in a different manner than described in conjunction with FIG. 6 in some embodiments. For example, some or all of the functionality of the console 615 may be provided by the headset 605.

The headset 605 includes the display assembly 630, an optics block 635, one or more position sensors 640, and the DCA 645. Some embodiments of headset 605 have different components than those described in conjunction with FIG. 6. Additionally, the functionality provided by various components described in conjunction with FIG. 6 may be differently distributed among the components of the headset 605 in other embodiments, or be captured in separate assemblies remote from the headset 605.

The display assembly 630 displays content to the user in accordance with data received from the console 615. The display assembly 630 displays the content using one or more display elements (e.g., the display elements 120). A display element may be, e.g., an electronic display. In various embodiments, the display assembly 630 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 635.

The optics block 635 may magnify image light received from the electronic display, corrects optical errors associated with the image light, and presents the corrected image light to one or both eyeboxes of the headset 605. In various embodiments, the optics block 635 includes one or more optical elements. Example optical elements included in the optics block 635 include: an aperture, a Fresnel lens, a convex lens, a concave lens, a filter, a reflecting surface, or any other suitable optical element that affects image light. Moreover, the optics block 635 may include combinations of different optical elements. In some embodiments, one or more of the optical elements in the optics block 635 may have one or more coatings, such as partially reflective or anti-reflective coatings.

Magnification and focusing of the image light by the optics block 635 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user field of view. Additionally, in some embodiments, the amount of magnification may be adjusted by adding or removing optical elements.

In some embodiments, the optics block 635 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 635 corrects the distortion when it receives image light from the electronic display generated based on the content.

The position sensor 640 is an electronic device that generates data indicating a position of the headset 605. The position sensor 640 generates one or more measurement signals in response to motion of the headset 605. The position sensor 190 is an embodiment of the position sensor 640. Examples of a position sensor 640 include: one or more IMUs, one or more accelerometers, one or more gyroscopes, one or more magnetometers, another suitable type of sensor that detects motion, or some combination thereof. The position sensor 640 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 605 from the sampled data. For example, the IMU integrates the measurement signals received from the accelerometers over time to estimate a velocity vector and integrates the velocity vector over time to determine an estimated position of a reference point on the headset 605. The reference point is a point that may be used to describe the position of the headset 605. While the reference point may generally be defined as a point in space, however, in practice the reference point is defined as a point within the headset 605.

The DCA 645 generates depth information for a portion of the local area. The DCA includes one or more imaging devices and a DCA controller. The DCA 645 may also include an illuminator. Operation and structure of the DCA 645 is described above with regard to FIG. 1A.

The audio system 650 provides audio content to a user of the headset 605. The audio system 650 is an embodiment of the audio system 200 described above. The audio system 650 may comprise one or more acoustic sensors, one or more transducers, and an audio controller. The audio system 650 may provide spatialized audio content to the user. In some embodiments, the audio system 650 may request acoustic parameters from the mapping server 625 over the network 620. The acoustic parameters describe one or more acoustic properties (e.g., room impulse response, a reverberation time, a reverberation level, etc.) of the local area. The audio system 650 may provide information describing at least a portion of the local area from e.g., the DCA 645 and/or location information for the headset 605 from the position sensor 640. The audio system 650 may generate one or more sound filters using one or more of the acoustic parameters received from the mapping server 625 and use the sound filters to provide audio content to the user.

The audio system 650 of the headset 605 is configured to spatialize virtual sound sources based on constraints such as use case and physical environment. The audio system 650 may take inputs from the position sensor 640 to determine the location of the headset within a physical. The audio system 650 may additionally take inputs from the DCA 645 to determine the distance from the headset 605 to objects in the physical environment that may be sound sources. The audio system 650 may transmit and receive information from the console 615 such as game data from the application store 655. Depending on the embodiment the audio system 650 may communicate with the I/O interface 610, network 620, and mapping server 625 as necessary.

The audio system 650 is additionally configured to spatialize virtual sound sources in the use case of a conference call. In this use case the audio system 650 may determine spectral profiles of participants of the conference call or receive the spectral profiles from a different audio system via the network 620. In some embodiment, the audio system 650 may communicate with the display assembly 630 to provide a visual representation of sound sources or spatialized virtual sound sources.

The I/O interface 610 is a device that allows a user to send action requests and receive responses from the console 615. An action request is a request to perform a particular action. For example, an action request may be an instruction to start or end capture of image or video data, or an instruction to perform a particular action within an application. The I/O interface 610 may include one or more input devices. Example input devices include: a keyboard, a mouse, a game controller, or any other suitable device for receiving action requests and communicating the action requests to the console 615. An action request received by the I/O interface 610 is communicated to the console 615, which performs an action corresponding to the action request. In some embodiments, the I/O interface 610 includes an IMU that captures calibration data indicating an estimated position of the I/O interface 610 relative to an initial position of the I/O interface 610. In some embodiments, the I/O interface 610 may provide haptic feedback to the user in accordance with instructions received from the console 615. For example, haptic feedback is provided when an action request is received, or the console 615 communicates instructions to the I/O interface 610 causing the I/O interface 610 to generate haptic feedback when the console 615 performs an action.

The console 615 provides content to the headset 605 for processing in accordance with information received from one or more of: the DCA 645, the headset 605, and the I/O interface 610. In the example shown in FIG. 6, the console 615 includes an application store 655, a tracking module 660, and an engine 665. Some embodiments of the console 615 have different modules or components than those described in conjunction with FIG. 6. Similarly, the functions further described below may be distributed among components of the console 615 in a different manner than described in conjunction with FIG. 6. In some embodiments, the functionality discussed herein with respect to the console 615 may be implemented in the headset 605, or a remote system.

The application store 655 stores one or more applications for execution by the console 615. An application is a group of instructions, that when executed by a processor, generates content for presentation to the user. Content generated by an application may be in response to inputs received from the user via movement of the headset 605 or the I/O interface 610. Examples of applications include: gaming applications, conferencing applications, video playback applications, or other suitable applications.

The tracking module 660 tracks movements of the headset 605 or of the I/O interface 610 using information from the DCA 645, the one or more position sensors 640, or some combination thereof. For example, the tracking module 660 determines a position of a reference point of the headset 605 in a mapping of a local area based on information from the headset 605. The tracking module 660 may also determine positions of an object or virtual object. Additionally, in some embodiments, the tracking module 660 may use portions of data indicating a position of the headset 605 from the position sensor 640 as well as representations of the local area from the DCA 645 to predict a future location of the headset 605. The tracking module 660 provides the estimated or predicted future position of the headset 605 or the I/O interface 610 to the engine 665.

The engine 665 executes applications and receives position information, acceleration information, velocity information, predicted future positions, or some combination thereof, of the headset 605 from the tracking module 660. Based on the received information, the engine 665 determines content to provide to the headset 605 for presentation to the user. For example, if the received information indicates that the user has looked to the left, the engine 665 generates content for the headset 605 that mirrors the user's movement in a virtual local area or in a local area augmenting the local area with additional content. Additionally, the engine 665 performs an action within an application executing on the console 615 in response to an action request received from the I/O interface 610 and provides feedback to the user that the action was performed. The provided feedback may be visual or audible feedback via the headset 605 or haptic feedback via the I/O interface 610.

The network 620 couples the headset 605 and/or the console 615 to the mapping server 625. The network 620 may include any combination of local area and/or wide area networks using both wireless and/or wired communication systems. For example, the network 620 may include the Internet, as well as mobile telephone networks. In one embodiment, the network 620 uses standard communications technologies and/or protocols. Hence, the network 620 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 620 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 620 can be represented using technologies and/or formats including image data in binary form (e.g., Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 625 may include a database that stores a virtual model describing a plurality of spaces, wherein one location in the virtual model corresponds to a current configuration of a local area of the headset 605. The mapping server 625 receives, from the headset 605 via the network 620, information describing at least a portion of the local area and/or location information for the local area. The information describing the local area may include spectral profiles of people in the local area which are communicated to the headset 605 to assist the headset in identifying spectral profiles it has encountered before. The user may adjust privacy settings to allow or prevent the headset 605 from transmitting information, including spectral profiles, to the mapping server 625. The mapping server 625 determines, based on the received information and/or location information, a location in the virtual model that is associated with the local area of the headset 605. The mapping server 625 determines (e.g., retrieves) one or more acoustic parameters associated with the local area, based in part on the determined location in the virtual model and any acoustic parameters associated with the determined location. The mapping server 625 may transmit the location of the local area and any values of acoustic parameters associated with the local area to the headset 605.

One or more components of system 600 may contain a privacy module that stores one or more privacy settings for user data elements. The user data elements describe the user or the headset 605. For example, the user data elements may describe a physical characteristic of the user, an action performed by the user, a location of the user of the headset 605, a location of the headset 605, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 600 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. An audio system comprising:

a microphone array configured to monitor sound in a local area;

a controller configured to:

identify sound sources within the local area using the monitored sound;

determine locations of the sound sources;

determine a target position for a virtual sound source based on one or more constraints, the one or more constraints including that the target position is at a distance greater than a threshold distance away from each of the determined locations so that the virtual sound source is distinguishable by a user from the sound sources without overlap; and generate one or more sound filters based in part on the target position; and a transducer array configured to present spatialized audio content including the virtual sound source based in part on the one or more sound filters.

2. The audio system of claim 1 wherein the controller is further configured to:

analyze the sound sources for characteristics comprising spatial, time, and frequency attributes; and generate, based on the characteristics of the analyzed sound sources, one or more constraints.

3. The audio system of claim 1, wherein the virtual sound source is a voice of a first call participant, and the controller is further configured to:

analyze a first spectral profile of the virtual sound source, the first spectral profile characterizing frequencies present in the voice of the first call participant; and determine, based on the first spectral profile of the first call participant, a first angle at which to spatialize the virtual sound source, wherein the first angle is selected based in part on an amount of low frequency content relative to an amount of high frequency content in the first spectral profile, and the target position is based in part on the first angle.

4. The audio system of claim 3, wherein the target position is head-centric.

5. The audio system of claim 3, wherein a second spectral profile of a second call participant has a greater amount of low frequency content relative to an amount of high frequency content than that of the first spectral profile of the first call participant, and the controller is further configured to:

analyze the second spectral profile, the second spectral profile characterizing frequencies present in a voice of a second virtual sound source;

determine, based on the second spectral profile, a second angle at which to virtually spatialize a second virtual sound corresponding to the second call participant, wherein the second angle is selected based in part on the amount of low frequency content relative to the amount of high frequency content in the second spectral profile, and the second angle is greater than the first angle; and determine a second target position for the second virtual sound source based in part on the second angle, wherein the one or more sound filters are generated based in part on the second target position, and the spatialized audio content is such that the virtual sound source is spatialized to the target position and the second virtual sound source is spatialized to the second target position.

6. The audio system of claim 1, wherein the controller is further configured to:

identify a use case of a plurality of use cases of the audio system; and select the one or more constraints based in part on the identified use case.

7. The audio system of claim 6, wherein the identified use case is providing directions, and the one or more constraints include placing the target position such that it corresponds with a navigational prompt.

8. The audio system of claim 6, wherein the target position is world-centric.

9. The audio system of claim 1, wherein the controller is further configured to:

determine locations of physical objects within the local area; and set at least one of the one or more constraints such that the target position is not co-located with the determined locations of the physical objects.

10. A method comprising:

monitoring sound in a local area via a microphone array;

identifying sound sources within the local area using the monitored sound;

determining locations of the sound sources;

determining a target position for a virtual sound source based on one or more constraints, the one or more constraints including that the target position is at a distance greater than a threshold distance away from each of the determined locations so that the virtual sound source is distinguishable by a user from the sound sources without overlap; and generating one or more sound filters based on the target position; and presenting spatialized audio content including the virtual sound source based in part on the one or more sound filters.

11. The method of claim 10 wherein determining a target position for the virtual sound source further comprises:

analyzing the sound sources for characteristics comprising spatial, time, and frequency attributes; and generating, based on the characteristics of the analyzed sound sources, one or more constraints.

12. The method of claim 10, wherein the virtual sound source is a voice of a first call participant, further comprising:

analyzing a first spectral profile of the virtual sound source, the first spectral profile characterizing frequencies present in the voice of the first call participant; and determining, based on the first spectral profile of the first call participant, a first angle at which to spatialize the virtual sound source, wherein the first angle is selected based in part on an amount of low frequency content relative to an amount of high frequency content in the first spectral profile, and the target position is based in part on the first angle.

13. The method of claim 12, wherein a second spectral profile of a second call participant has a greater amount of low frequency content relative to an amount of high frequency content than that of the first spectral profile of the first call participant, further comprises:

analyzing the second spectral profile, the second spectral profile characterizing frequencies present in a voice of a second virtual sound source;

determining, based on the second spectral profile, a second angle at which to virtually spatialize a second virtual sound corresponding to the second call participant, wherein the second angle is selected based in part on the amount of low frequency content relative to the amount of high frequency content in the second spectral profile, and the second angle is greater than the first angle;

determining a second target position for the second virtual sound source based in part on the second angle; and generating one or more sound filters based in part on the second target position, and the spatialized audio content is such that the virtual sound source is spatialized to the target position and the second virtual sound source is spatialized to the second target position.

14. The method of claim 10, further comprising:

identifying a use case of a plurality of use cases of an audio system; and selecting the one or more constraints based in part on the identified use case.

15. The method of claim 14, wherein the identified use case is providing directions, and the one or more constraints include placing the target position such that it corresponds with a navigational prompt.

16. The method of claim 10, further comprising:

determining locations of physical objects within the local area; and setting at least one of the one or more constraints such that the target position is not co-located with the determined locations of the physical objects.

17. A non-transitory computer readable medium configured to store program code instructions, when executed by a processor of a device, cause the device to perform steps comprising:

monitoring sound in a local area via a microphone array;

identifying sound sources within the local area using the monitored sound;

determining locations of the sound sources;

determining a target position for a virtual sound source based on one or more constraints, the one or more constraints including that the target position is at a distance greater than a threshold distance away from each of the determined locations so that the virtual sound source is distinguishable by a user from the sound sources without overlap;

generating one or more sound filters based on the target position; and presenting spatialized audio content including the virtual sound source based in part on the one or more sound filters.

18. The non-transitory computer readable medium of claim 17 wherein determining the target position for a virtual sound source further comprises:

analyzing the sound sources for characteristics comprising spatial, time, and frequency attributes; and generating, based on the characteristics of the analyzed sound sources, one or more constraints.

19. The non-transitory computer readable medium of claim 17, wherein the virtual sound source is a voice of a first call participant, and the instructions, when executed by the processor, cause the device to perform further steps comprising:

analyzing a first spectral profile of the virtual sound source, the first spectral profile characterizing frequencies present in the voice of the first call participant; and determining, based on the first spectral profile of the first call participant, a first angle at which to spatialize the virtual sound source, wherein the first angle is selected based in part on an amount of low frequency content relative to an amount of high frequency content in the first spectral profile, and the target position is based in part on the first angle.

20. The non-transitory computer readable medium of claim 19, wherein a second spectral profile of a second call participant has a greater amount of low frequency content relative to an amount of high frequency content than that of the first spectral profile of the first call participant, and the instructions, when executed by the processor, cause the device to perform further steps comprising:

analyzing the second spectral profile, the second spectral profile characterizing frequencies present in a voice of a second virtual sound source;

determining, based on the second spectral profile, a second angle at which to virtually spatialize a second virtual sound corresponding to the second call participant, wherein the second angle is selected based in part on the amount of low frequency content relative to the amount of high frequency content in the second spectral profile, and the second angle is greater than the first angle;

determining a second target position for the second virtual sound source based in part on the second angle; and generating one or more sound filters based in part on the second target position, and the spatialized audio content is such that the virtual sound source is spatialized to the target position and the second virtual sound source is spatialized to the second target position.

* * * * *